Jan. 17, 1950     A. G. LA MONTAGNE     2,494,948
ARTIFICIAL FISH LURE

Filed May 14, 1946

Inventor
ARTHUR G. LA MONTAGNE,

Attorneys

Patented Jan. 17, 1950

2,494,948

UNITED STATES PATENT OFFICE 2,494,948

ARTIFICIAL FISH LURE

Arthur G. La Montagne, Sutter, Calif.

Application May 14, 1946, Serial No. 669,660

3 Claims. (Cl. 43—42.48)

This invention relates to an artificial fish lure, or bait.

A primary object of this invention is the provision of an improved fish lure characterized by an asymmetrical construction, and having hooks at opposite ends thereof, whereby a different movement of the plug, or artificial lure, may be obtained, dependent upon the direction in which the same is trolled.

An additional object of the invention is the provision of such a device which will be attractive to various types of fish in accordance with the movement thereof and under varying conditions of tide and weather.

A still further object of the invention is the provision of an artificial fish lure, or plug, readily adaptable to a variety of ornamentation to attract different types of fish.

Further objects will in part be obvious and in part be pointed out as the description of the invention proceeds, and shown in the accompanying drawings, wherein there are disclosed preferred embodiments of this inventive concept.

In the drawings.

Similar reference characters refer to similar parts throughout the several views of the drawings.

Figure 1:
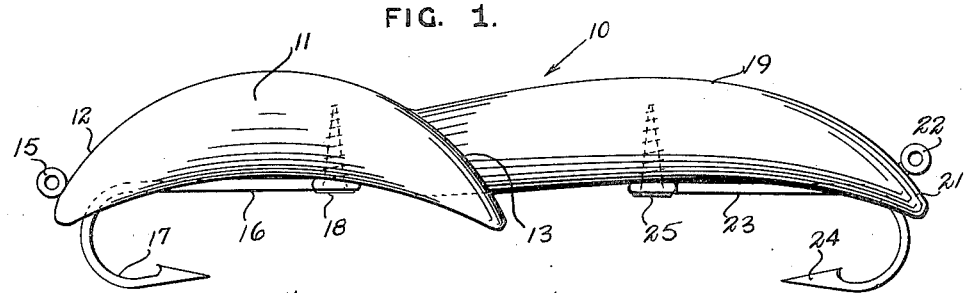
Figure 1 is a side elevational view of one form of plug embodying features of the instant invention, certain concealed portions thereof being indicated in dotted lines.
Figure 2:
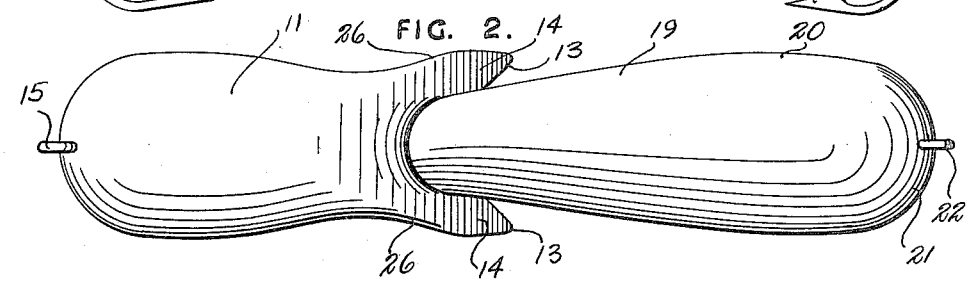
Figure 2 is a top plan view of the construction shown in Figure 1.

Referring now to the drawings, and more particularly to Figures 1 and 2, the device of the instant invention is comprised of a body generally indicated at 10 of asymmetrical longitudinal configuration, including a body element 11 of arcuate configuration longitudinally, having a sloping forward surface 12, and outwardly-projecting tapering rear surfaces 13, presenting a pair of spaced relatively flat inclined tongues 14 rearwardly of the portion 11. An eye 15 is provided at the lower extremity of the forward incline 12, and the shank 16 of a hook 17 is aligned along the lower body portion, being secured thereto, as by a screw 18. The rear portion 19 of the body extends rearwardly between the tongues 14 and expands outwardly, as indicated at 20, and terminates in an inclined rear surface 21. An eye 22 is provided adjacent the extremity of the rear surface 21, and the shank 23 of a hook 24 is secured to the under side of the portion 19, as by a screw 25.

The forward body portion 11 is smoothly rounded, as indicated at 26, merging into the tongues 14.

It will now be seen that when the body is pulled forwardly by means of the eye 15, as in trolling, or when cast, or the like, the hook 24 depends therefrom in such position as to impale a fish striking the lure. Correspondingly, when towed in this position, it will be seen that little turbulence is created in the water, inasmuch as the water flows smoothly and freely around and over the surfaces 13 and tongues 14, being guided thereabout by the rounded surface 26, thus imparting a relatively smooth slow motion to the device.

However, when the device is towed by the opposite eye 22, and the hook 17 positioned in such manner as to impale a striking fish, water striking against the tongues 14 of the outwardly-projecting surfaces 13 will cause deflection of the device from a straight path and serve to retard the forward motion of the device. Resultant turbulence in the water will cause a "wobble" of the device, and a materially different type and rate of movement from that occasioned by towing in the opposite direction.

Figure 3:
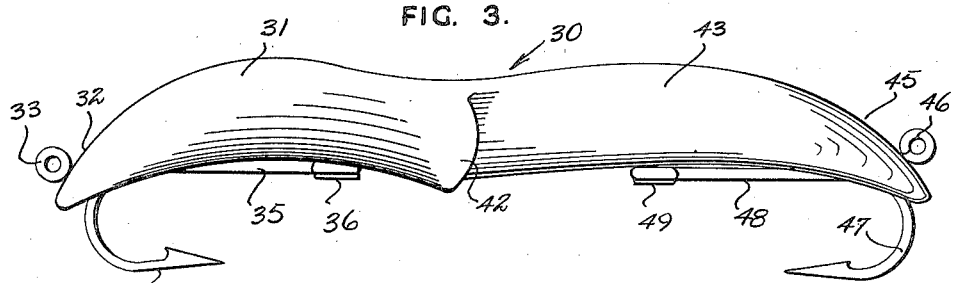
Figure 3 is a side elevational view of a modified form of construction.
Figure 4:
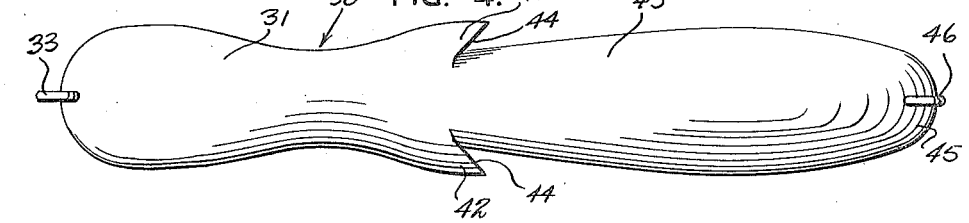
Figure 4 is a top plan view of the device shown in Figure 3.

In the modification shown in Figures 3 and 4, there is generally indicated at 30 a body, including a forward body portion 31 having an inclined forward surface 32, an eye 33, and a hook 34, the shank 35 of which is secured in the under side of the body by screws 36. The rear extremity of the body portion 31 terminates in vanes or lugs 42 extending in a horizontal plane outwardly from the rear body portion 43. The inner faces 44 of the vanes 42 form channels or grooves vertically of the body when towed, and act in a manner similar to that previously discussed in connection with the surfaces 13 and tongues 14. The rear portion of the body 30 is substantially similar in configuration to that of the body 10, and includes an inclined rear surface 45 provided with an eye 46 and a hook 47, the shank 48 of which is secured to the under side of the body, as by a screw 49.

In the operation of this construction, it will be seen that when the device is towed by the eye 33, a relatively smooth forward motion will be effected, but that conversely, when towed by the eye 46, the faces 44 of the vanes or lugs 42 will effect a turbulence in the water, resulting in a drag or retardation of the forward movement of the device, and a corresponding irregular "wobbling" movement.

From the foregoing it will now be seen that there is herein provided an improved fish lure characterized by relative versatility of movement, when towed in opposite directions, which accomplishes all the objects of this invention, and others including many advantages of great practical utility and commercial importance.

Obviously, the device may be made in a variety of sizes and ornamented in any suitable manner on the exterior surface thereof to attract the attention of a fish.

As various embodiments may be made of this inventive concept, and as various modifications may be made of the embodiments hereinbefore shown and described, it is to be understood that all matter herein is to be interpreted merely as illustrative and not in a limiting sense.

I claim:

1. A fish lure comprising a body element of irregular configuration longitudinally, said element embodying a forward portion and a rear portion, said forward portion having a surface sloping forwardly and downwardly and spaced outwardly projecting tapering rear surfaces at the rear of said forward portion, an eye on the front of said sloping surface for towing said body element in one direction, a hook having a barb facing toward the rear portion arranged contiguous to said eye and dependingly carried by said forward portion, said rear portion extending from between the outwardly projecting surfaces at the rear of said forward portion and terminating in a rear surface sloping rearwardly and downwardly, a second eye on the upper face of said inclined rear surface of said rear portion for towing said body element in the opposite direction, and a second hook having a barb facing toward the forward portion arranged contiguous to said second-named eye and dependingly carried by said rear portion, said sloping and outwardly projecting surfaces causing the lure to travel in a straight path in the one direction when towed by said first-named eye and causing the lure to travel in a path deflected from a straight path when towed by said second-named eye.

2. A fish lure comprising a body element of irregular configuration longitudinally, said element embodying a forward portion and a rear portion, said forward portion having a surface sloping forwardly and downwardly and tapering rear surfaces terminating in vanes extending outwardly from the rear of said forward portion, the inner faces of said vanes forming vertical channels at the rear of said forward portion, an eye on the front of said sloping surface for towing said body element in one direction, a hook having a barb facing toward the rear portion arranged contiguous to said eye and dependingly carried by said forward portion, said rear portion extending from between the vanes at the rear of said forward portion and terminating in a rear surface sloping rearwardly and downwardly, a second eye on the upper face of said inclined rear surface of said rear portion for towing said body element in the opposite direction, and a second hook having a barb facing toward the forward portion arranged contiguous to said second-named eye and dependingly carried by said rear portion, said sloping surfaces and channels causing the lure to travel in a straight path in the one direction when towed by said first-named eye and causing the lure to travel in a path deflected from a straight path when towed by said second-named eye.

3. A fish lure comprising a body element of irregular configuration longitudinally, said element embodying a forward portion and a rear portion, said forward portion having a surface sloping forwardly and downwardly and spaced outwardly projecting tapering rear surfaces each terminating in a relatively flat inclined tongue at the rear of said forward portion, an eye on the front of said sloping surface for towing said body element in one direction, a hook having a barb facing toward the rear portion arranged contiguous to said eye and dependingly carried by said forward portion, said rear portion extending from between the tongues at the rear of said forward portion and outwardly and terminating in a rear surface sloping rearwardly and downwardly, a second eye on the upper face of the sloping rear surface of said rear portion for towing said body element in the opposite direction, and a second hook having a barb facing toward the forward portion arranged contiguous to said second-named eye and dependingly carried by said rear portion, said sloping surfaces and tongues causing the lure to travel in a straight path in the one direction when towed by said first-named eye and causing the lure to travel in a path deflected from a straight path when towed by said second-named eye.

ARTHUR G. LA MONTAGNE.

REFERENCES CITED

The following references are of record in the file of this patent:

UNITED STATES PATENTS

| Number | Name | Date |
|---|---|---|
| 1,017,088 | Dremel | Feb. 13, 1912 |
| 1,525,291 | Green | Feb. 3, 1925 |
| 1,627,455 | Peterson | May 3, 1937 |
| 1,854,028 | Gruenhagen | Apr. 12, 1932 |
| 2,159,591 | Leusch et al. | May 23, 1939 |
| 2,347,743 | Koering | May 2, 1944 |

FOREIGN PATENTS

| Number | Country | Date |
|---|---|---|
| 105,804 | Sweden | Oct. 27, 1942 |